H. TOBLER.
SULFURIC AND HALOID ACIDS.
APPLICATION FILED JAN. 9, 1919.
1,332,581.
Patented Mar. 2, 1920.
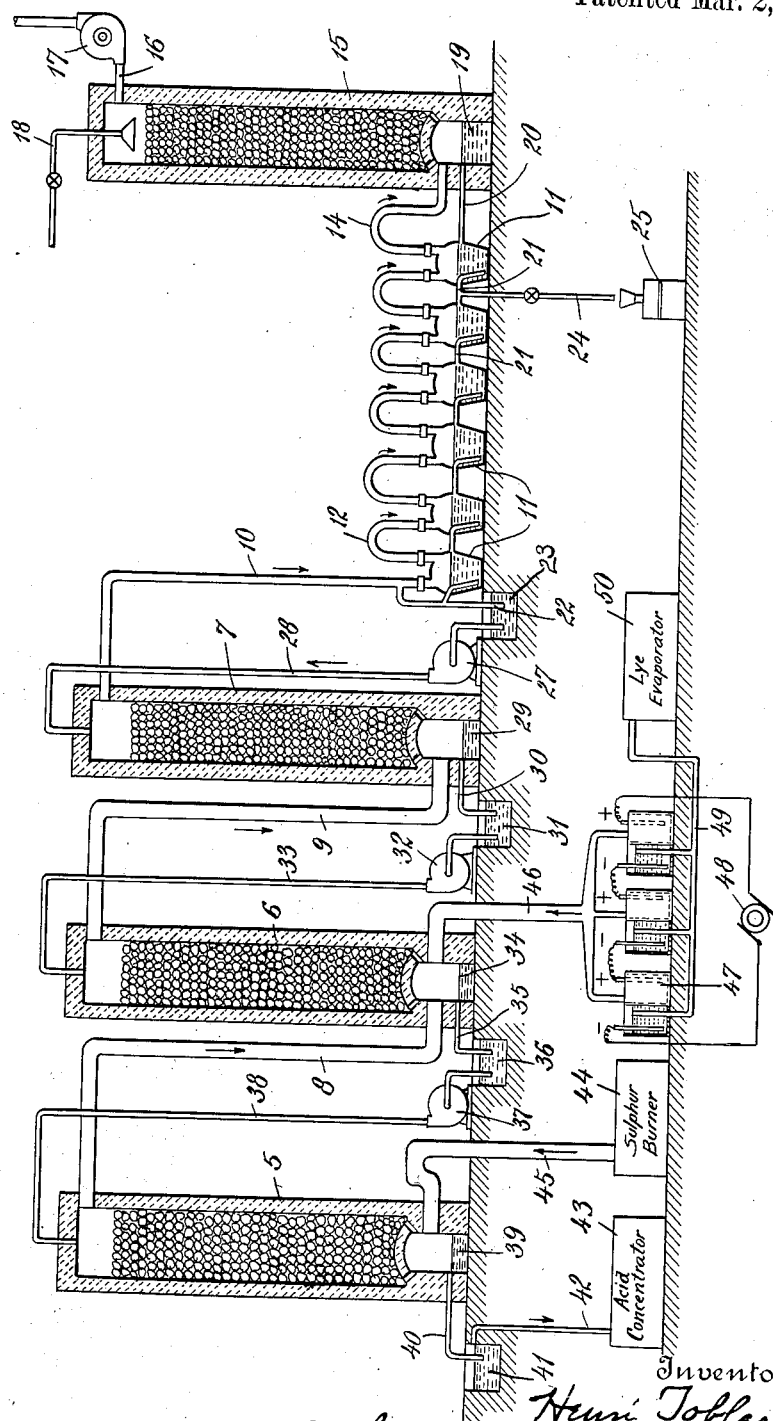

UNITED STATES PATENT OFFICE.

HENRI TOBLER, OF HACKENSACK, NEW JERSEY, ASSIGNOR TO AMERICAN BROMINE COMPANY, OF MAYWOOD, NEW JERSEY, A CORPORATION OF NEW JERSEY.

SULFURIC AND HALOID ACIDS.

1,332,581.     Specification of Letters Patent.     Patented Mar. 2, 1920.

Application filed January 9, 1919. Serial No. 270,271.

*To all whom it may concern:*

Be it known that I, HENRI TOBLER, residing at Hackensack, in the county of Bergen, State of New Jersey, have invented certain new and useful Improvements in Sulfuric and Haloid Acids; and I do hereby declare the following to be a full, clear, and exact description of the invention, such as will enable others skilled in the art to which it appertains to make and use the same.

This invention relates to the manufacture of sulfuric and hydrochloric acids and has for its object the production of these acids simultaneously and continuously without wasteful by-products.

A further object of my invention is the provision of a process of producing sulfuric and hydrochloric acids in which every atom of sulfur employed is finally recovered in acid form, by directly combining sulfur dioxid, chlorin and water.

Further objects of my invention reside in the provision of a process in which all materials entering the reaction are recovered in the form of useful and desirable products and in the various combinations hereinafter described and claimed as will be apparent as the invention is better understood by reference to the following specification when read in connection with the accompanying drawing diagrammatically illustrating an apparatus adapted for use in carrying out my invention.

The production of sulfuric and hydrochloric acids have previously been independently accomplished by distinct processes having no relation other than that sulfuric acid, previously produced, is employed in the manufacture of hydrochloric acid.

Sulfuric acid is produced by bringing sulfur dioxid into contact with nitrogen oxid and water vapor in what is commonly called the "chamber process" and also by bringing sulfur dioxid into contact with heated catalytic agents in the so-called "contact process". Hydrochloric acid is produced by heating common salt with sulfuric acid in a suitable furnace and absorbing the gaseous hydrochloric acid evolved in water until a saturated solution is obtained.

The production of sulfuric acid may be indicated by equations as follows:—

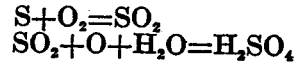

$$S+O_2=SO_2$$
$$SO_2+O+H_2O=H_2SO_4$$

and the production of hydrochloric acid by the following equation:—

$$2NaCl+H_2SO_4=Na_2SO_4+2HCl$$

It will be noted that all the sulfuric acid employed in the hydrochloric acid process is destroyed and appears in the form of sodium sulfate, a relatively valueless product difficultly disposable and entirely undesirable from any standpoint. The only useful product resulting from the two processes is the hydrochloric acid recovered.

I have discovered that sulfur dioxid, chlorin and water may be directly and concurrently combined to produce sulfuric and hydrochloric acids in accordance with the following equation:—

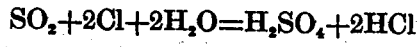

$$SO_2+2Cl+2H_2O=H_2SO_4+2HCl$$

which indicates the ultimate combination, although it is of course to be understood that various minor and more or less obscure reactions occur during the combination which it is not necessary to illustrate in detail in order that my invention may be understood.

I obtain the sulfur dioxid by burning sulfur or roasting pyrites in ordinary burners such as is commonly used in the manufacture of sulfuric acid. The chlorin is obtained by decomposing common salt or sodium chlorid in an electrolytic cell of the diaphragm or mercury type and in accordance with the well understood principle as indicated by the following equation:—

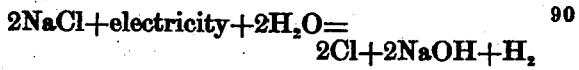

$$2NaCl+\text{electricity}+2H_2O=2Cl+2NaOH+H_2$$

As will be readily apparent by reference to the equation illustrating the direct combination of sulfur dioxid and chlorin to produce sulfuric and hydrochloric acids in connection with the foregoing statement as to the source of the sulfur dioxid and chlorin, I am able to obtain from the same quantity of material normally employed in the production of hydrochloric acid alone, to-wit, one atom of sulfur and two molecules of common salt or sodium chlorid, three important chemicals which are the sole products of the reactions involved. These products are one molecule of sulfuric acid, two molecules of hydrochloric acid, and two molecules of caustic soda.

Referring to the drawing, I provide a plurality of towers, preferably three, numbered respectively 5, 6 and 7. These towers are similar in construction to the socalled Glover towers employed in the manufacture of sulfuric acid, being constructed of acid-proof material and packed with vitrified or stoneware bricks or balls. The towers 5, 6 and 7 are connected by acid-proof pipes 8 and 9 adapted to carry gases and vapors from the upper portion of each tower to the lower portion of the succeeding tower. A pipe 10 connects the upper portion of the tower 7 to the first of a series of tourills or receivers 11 such as are commonly employed in the manufacture of hydrochloric acid. The tourills 11 are connected by pipes 12 which permit the passage of gases serially therethrough. The last tourill 11 of the series is connected by a pipe 14 to the lower portion of a tower 15 similar to those previously described and having an outlet pipe 16 connected to a blower 17 which serves to draw the gases and vapors through the system.

Water is delivered to the upper portion of the tower 15 by a pipe 18 and passes downwardly in contact with the gases and vapors rising through the tower, finally collecting in the receiving portion 19 of the tower after having absorbed the hydrochloric acid present in the gases and vapors. From the receiving portion 19 the saturated solution of acid flows through a pipe 20 to the adjacent tourill 11 and thence through pipes 21 and preceding tourills 11. From the first tourill 11 of the series the acid is delivered by a pipe 22 to the sump 23. The acid collected in the tourill 11 adjacent the tower 15 is a substantially pure solution of hydrochloric acid gas and a portion is withdrawn through the pipe 24 to the carboy 25.

The liquid collected in the sump 23 consists of a water solution of hydrochloric acid gas containing some sulfuric acid and has a gravity of about 23° Baumé. It is raised by a pump 27 and delivered through a pipe 28 to the upper portion of the tower 7 and passes downwardly therein in contact with the gases and vapors rising therethrough passing into the receiving portion 29 of the tower and thence through a pipe 30 into the sump 31. The liquid thus collected consists of a water solution of hydrochloric acid gas containing a higher proportion of sulfuric acid and has a gravity of about 36° Baumé.

The liquid is lifted by a pump 32 and delivered by a pipe 33 to the upper portion of the tower 6 and passes downwardly therethrough in contact with the gases rising therein. The liquid accumulates in the receiving portion 34 of the tower and is delivered through a pipe 35 to the sump 36. The liquid thus collected is sulfuric acid carrying a relatively small proportion of hydrochloric acid gas and water and has a gravity of about 50° Baumé.

The acid from the sump 36 is lifted by the pump 37 and is delivered through the pipe 38 to the upper portion of the tower 5 and passes downwardly in contact with the gases rising therein, finally collecting in the receiving portion 39 of the tower and passing through the pipe 40 to the sump 41. The acid thus collected is sulfuric acid free from hydrochloric acid and has a gravity of about 60° Baumé. The acid is withdrawn from the sump 41 through a pipe 42 and is treated in a concentrator 43 until the gravity is increased to 65.5 or 66° Baumé.

Sulfur dioxid is produced in the burner 44 and is delivered to the lower portion of the tower 5 through a pipe 45, passes upwardly in the tower 5 where its temperature is utilized in distilling off water and any hydrochloric acid which may be present. The mixed sulfur dioxid and hydrochloric acid gas and water vapor pass through the pipe 8 to the lower portion of the tower 6 where they are mixed with chlorin, delivered to the lower portion of the tower 6 through a pipe 46 from a series of electrolytic cells 47 in which a solution of common salt or sodium chlorid is subjected to the action of electric current from a source of power 48. The mixture of sulfur dioxid and chlorin in the presence of water reacts to produce sulfuric and hydrochloric acids. The sulfuric acid passes downwardly with the liquid descending in the tower while the greater portion of the hydrochloric acid, together with some sulfur dioxid and chlorin, pass through the pipe 9 into the tower 7 where the reaction is completed and from which hydrochloric acid gas carrying a relatively small proportion of sulfuric acid is delivered through the pipe 10 to the tourills 11 11 as previously described.

The solution of caustic lye or sodium hydrate which is a by-product of the electrolysis in the cells 47 is conveyed by a pipe 49 to an evaporator 50 from which caustic soda is recovered.

While I have described my process more particularly with reference to hydrochloric acid it is to be understood that other halogens may be substituted for chlorin with the resulting formation of corresponding haloid acids.

From the foregoing it will be readily understood that I have perfected a continuous process of producing sulfuric and haloid acids and incidentally sodium hydrate, thus accomplishing a result which has heretofore required at least two distinct processes, and that, through the operation of my process, I am able to recover all of the material used in a desirable and useful form and without the necessity of resorting to subsidiary processes to convert and utilize the by-products. By following my process it is possible to recover from the same materials heretofore utilized in producing hydrochloric acid alone both sulfuric acid, which is normally destroyed in the hydrochloric acid process as heretofore practised, and sodium hydrate in place of the useless sodium sulfate which forms a large proportion of the product of the common hydrochloric acid process. My process as herein described is exceedingly simple, requiring no apparatus in addition to that normally employed in producing sulfuric and hydrochloric acids other than the chlorin cells, which are of a common type well understood and exceedingly efficient. I am enabled to eliminate the salt cake furnace employed in the usual hydrochloric acid process and requiring the arduous labor of numerous attendants.

Various changes may be made in the process as hereinbefore described including variation of the apparatus employed and the regulation thereof without departing from the spirit and scope of the invention or sacrificing any of its material advantages, the form hereinbefore described being merely the preferred embodiment hereof.

I claim:

1. A process of producing sulfuric and haloid acids which comprises successively introducing and concurrently combining sulfur dioxid and a halogen in a flowing stream consisting of a mixture of said acids with water, said stream being finally subjected to the action of sulfur dioxid alone to separate the haloid acid therefrom.

2. A process of producing sulfuric and haloid acids which comprises successively introducing and concurrently combining sulfur dioxid and a halogen in a flowing stream of said acids containing water, the sulfuric acid present in said stream being progressively concentrated during its travel, said stream being finally subjected to the action of sulfur dioxid alone to separate the haloid acid therefrom.

3. A process of producing sulfuric and haloid acids which comprises successively introducing and concurrently combining sulfur dioxid and a halogen in a flowing stream of said acids, concentrating the sulfuric acid progressively, subjecting the stream finally to the action of sulfur dioxid alone to separate the haloid acid therefrom, and absorbing the gaseous haloid acid in water to form the haloid acid portion of said stream.

4. A process of producing sulfuric and haloid acids which comprises introducing and concurrently combining sulfur dioxid and a halogen in a flowing stream of said acids, progressively concentrating the sulfuric acid, separating the gaseous haloid acid therefrom, absorbing the gaseous haloid acid in water to form the haloid acid portion of said stream and withdrawing some of the haloid acid solution from said stream.

5. A process of producing sulfuric and haloid acids which comprises introducing and concurrently combining sulfur dioxid and a halogen in a flowing stream of said acids, continuously replenishing said stream with water, absorbing haloid acid gas in said water, recovering a portion of the solution of haloid acid, and absorbing haloid acid gas mixed with vapors of sulfuric acid in the remainder of said solution to form said stream.

6. A process of producing sulfuric and haloid acids which comprises introducing hot sulfur dioxid to a flowing stream of said acids containing water to distil out the haloid acid and a portion of the water, conveying the mixture of sulfur dioxid, haloid acid gas and water vapor to another portion of said stream, introducing a halogen to said stream and concurrently combining the sulfur dioxid, halogen and water.

7. A process of producing sulfuric and haloid acids which comprises introducing hot sulfur dioxid into a flowing stream of said acids containing water to distil out the haloid acid gas, conveying the mixture of sulfur dioxid and haloid acid and water vapor to another portion of said stream, introducing a halogen to said stream, concurrently combining the sulfur dioxid and halogen with water present in said stream, and conveying the escaping gases to still another portion of said stream to complete the reaction and to wash the gaseous haloid acid.

8. A process of producing sulfuric and haloid acids which comprises establishing a body of said acids containing water, introducing and concurrently combining sulfur dioxid and a halogen with said water, separating the haloid acid in a gaseous condition as formed, absorbing the gaseous haloid acid in water, withdrawing a portion of the solution thus formed, and utilizing a portion of the solution to establish said body of sulfuric and haloid acids.

9. A process of producing sulfuric and haloid acids which comprises causing a stream of said acids and water to flow continuously, introducing and concurrently combining sulfur dioxid and a halogen with said water, separating the haloid acid in a gaseous condition as formed, absorbing the haloid acid in water, recovering a portion of the solution thus formed and delivering the remainder of said solution to said stream.

10. A process of producing sulfuric and haloid acids which comprises causing a stream of said acid containing water to flow continuously, successively introducing sulfur dioxid and a halogen to said stream, concurrently combining said sulfur dioxid and halogen with said water, separating the haloid acid in a gaseous condition as formed, recovering the sulfuric acid free of said haloid acid, absorbing the latter in water, recovering a portion of the solution thus formed and utilizing the remainder to form said stream.

11. A process of producing sulfuric and haloid acids which comprises successively introducing and concurrently combining sulfur dioxid and a halogen with water, causing the stream of water and acids to flow in one direction, finally subjecting said stream to the action of sulfur dioxid alone and separating and causing the gaseous haloid acid to flow in the opposite direction.

12. A process of producing sulfuric and haloid acids which comprises establishing a flowing stream of said acids with water, establishing a counter current of gases by successively introducing sulfur dioxid and a halogen to said stream and concurrently combining said sulfur dioxid and halogen with said water.

13. A process of producing sulfuric and haloid acids which comprises establishing a flowing stream of said acids with water, establishing a counter current of gases by successively introducing sulfur dioxid and a halogen to said stream, concurrently combining said sulfur dioxid and halogen with said water, separating the gaseous haloid acid as formed, and conveying it in the direction of said counter current.

14. A process of producing sulfuric and haloid acids which comprises establishing a flowing stream of said acids with water, establishing a counter current of gases including sulfur dioxid and a halogen, concurrently combining said sulfur dioxid and halogen with said water, separating the gaseous haloid acid as formed, conveying it in the direction of said counter current, absorbing said haloid acid in water, recovering a portion of the solution and delivering the remainder to said stream.

In testimony whereof I affix my signature.

HENRI TOBLER.